(12) United States Patent
Held

(10) Patent No.: US 9,254,734 B2
(45) Date of Patent: Feb. 9, 2016

(54) MULTI-COMPONENT ROOF FOR AN OPEN-AIR VEHICLE

(71) Applicant: Michael P. Held, West Seneca, NY (US)

(72) Inventor: Michael P. Held, West Seneca, NY (US)

( * ) Notice: Subject to any disclaimer, the term of this patent is extended or adjusted under 35 U.S.C. 154(b) by 0 days.

(21) Appl. No.: 14/186,551

(22) Filed: Feb. 21, 2014

(65) Prior Publication Data

US 2014/0232147 A1 Aug. 21, 2014

Related U.S. Application Data

(60) Provisional application No. 61/767,324, filed on Feb. 21, 2013, provisional application No. 61/867,742, filed on Aug. 20, 2013, provisional application No. 61/915,123, filed on Dec. 12, 2013.

(51) Int. Cl.
*B60R 13/07* (2006.01)
*B60J 7/00* (2006.01)
*B60J 7/12* (2006.01)
*B60J 5/06* (2006.01)
*B60Q 1/26* (2006.01)
*B60Q 1/32* (2006.01)

(52) U.S. Cl.
CPC ...... *B60J 7/0015* (2013.01); *B60J 5/06* (2013.01); *B60J 7/1226* (2013.01); *B60Q 1/2611* (2013.01); *B60Q 1/32* (2013.01)

(58) Field of Classification Search
CPC .......... B60J 7/145; B60J 1/1823; B60J 1/183; B60J 7/047; B60J 10/06; B60J 5/0487; B60J 7/10; A63B 2055/082; Y10S 280/05; E04B 1/3444
USPC .................. 296/210, 107.07, 107.08, 107.15, 296/107.17, 97.1, 98, 102, 79, 83, 141; 135/88.07, 88.11; 280/DIG. 5; 405/293; 52/66, 69, 79.5, 71

See application file for complete search history.

(56) References Cited

U.S. PATENT DOCUMENTS

| | | | | |
|---|---|---|---|---|
| 1,442,255 A * | 1/1923 | Doner | .......................... | 296/97.8 |
| 1,932,475 A * | 10/1933 | Peteler | ............................ | 160/29 |
| 4,773,694 A * | 9/1988 | Gerber | ......................... | 296/77.1 |
| 4,830,037 A * | 5/1989 | Held | .......................... | 135/88.09 |
| 4,848,827 A * | 7/1989 | Ou | ................................ | 296/99.1 |
| 5,010,941 A * | 4/1991 | Ross et al. | .................... | 160/330 |
| 5,098,149 A * | 3/1992 | Lee | ................................ | 296/97.6 |
| 5,146,967 A * | 9/1992 | Chapman | ..................... | 150/159 |
| 5,259,656 A * | 11/1993 | Carroll | ......................... | 296/77.1 |
| 5,588,690 A * | 12/1996 | Showalter | ..................... | 296/77.1 |
| 5,788,317 A * | 8/1998 | Nation | ............................ | 296/141 |
| 5,921,609 A * | 7/1999 | Mills et al. | .................... | 296/138 |

(Continued)

*Primary Examiner* — Kiran B Patel
(74) *Attorney, Agent, or Firm* — Patricia M. Costanzo

(57) ABSTRACT

A multi-component open-air vehicle roof structured to have a retractable enclosure storage compartment along a length of a driver's and passenger's side of the roof, and retractable enclosures to be supported and protected by the retractable enclosure storage compartments, and a rear-side retractable enclosure with a choice of having either rear-side roof supports shaped to act as a storage compartment or having a rear-side compartment as part of the rear-side edge area of the roof, either to act as a roof support storage compartment for the rear-side retractable enclosure when it is retracted. On each roof side there is a wing valence support for supporting a decorative valence and an optional lighting system. The retractable enclosures may be powered or manually controlled. The roof's ribbed, single-ply construction provides for a stronger roof with a plurality of storage compartments for a plurality of accessories within the ribs.

5 Claims, 8 Drawing Sheets

(56) References Cited

U.S. PATENT DOCUMENTS

| | | | |
|---|---|---|---|
| 5,975,613 A * | 11/1999 | Sippel | 296/77.1 |
| 6,068,325 A * | 5/2000 | Hughes | 296/100.16 |
| 6,206,451 B1 * | 3/2001 | Maano | 296/136.04 |
| 6,216,714 B1 * | 4/2001 | Tucker | 135/88.01 |
| 6,220,647 B1 * | 4/2001 | Winkler | 296/100.14 |
| 6,227,603 B1 * | 5/2001 | Brock | 296/100.14 |
| 6,293,610 B1 * | 9/2001 | Howard | 296/148 |
| 6,341,811 B1 * | 1/2002 | Schoelkopf | 296/154 |
| 6,416,109 B1 * | 7/2002 | Tyrer et al. | 296/100.11 |
| 6,547,304 B1 * | 4/2003 | Conner et al. | 296/79 |
| 6,547,312 B2 * | 4/2003 | Winkler | 296/100.14 |
| 6,663,161 B1 * | 12/2003 | Tyrer | 296/100.11 |
| 6,805,396 B2 * | 10/2004 | True et al. | 296/100.14 |
| 6,979,044 B2 * | 12/2005 | Tyrer | 296/100.14 |
| 7,213,864 B2 * | 5/2007 | Gasper | 296/83 |
| 7,234,753 B2 * | 6/2007 | Held et al. | 296/100.18 |
| 7,431,377 B2 * | 10/2008 | Tyrer | 296/100.14 |
| 8,069,899 B2 * | 12/2011 | Nation | 160/56 |
| 8,303,020 B1 * | 11/2012 | Held | 296/100.14 |
| 8,308,223 B2 * | 11/2012 | King | 296/190.03 |
| 8,419,107 B2 * | 4/2013 | Manchanda | 296/136.1 |
| 8,607,845 B2 * | 12/2013 | Wu | 160/370.21 |
| 8,662,563 B1 * | 3/2014 | Hardenbrook | 296/154 |
| 2004/0239140 A1 * | 12/2004 | Feinberg | 296/77.1 |
| 2005/0150533 A1 * | 7/2005 | Gerrie et al. | 135/88.12 |
| 2006/0163905 A1 * | 7/2006 | Held | 296/102 |
| 2006/0202503 A1 * | 9/2006 | Tyrer | 296/100.14 |
| 2006/0290163 A1 * | 12/2006 | Showalter et al. | 296/102 |
| 2007/0246092 A1 * | 10/2007 | Gerrie et al. | 135/88.07 |
| 2007/0278816 A1 * | 12/2007 | Hanson et al. | 296/104 |
| 2008/0174143 A1 * | 7/2008 | Showalter | 296/100.14 |
| 2010/0060027 A1 * | 3/2010 | Marsh et al. | 296/79 |
| 2011/0001330 A1 * | 1/2011 | Hirneise | 296/77.1 |
| 2011/0233957 A1 * | 9/2011 | Sams | 296/79 |
| 2011/0260019 A1 * | 10/2011 | Held | 248/201 |
| 2012/0311825 A1 * | 12/2012 | Schneider | 24/303 |
| 2013/0062905 A1 * | 3/2013 | Held | 296/141 |
| 2014/0035313 A1 * | 2/2014 | Sobik | 296/135 |

* cited by examiner

MULTI-COMPONENT ROOF FOR AN OPEN-AIR VEHICLE

CROSS-REFERENCE TO RELATED APPLICATIONS

This is a Non-Provisional Application of Provisional Application No. 61/767,324 filed on Feb. 21, 2013, and of Provisional Application No. 61/867,742 filed on Aug. 20, 2013, and of Provisional Application No. 61/915,123 filed on Dec. 12, 2013.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to accessories for open-air vehicles, and, more particularly, to a multi-component roof for an open-air vehicle having roof supports, where the multi-component roof structure includes storage containers into which the vehicle's retractable enclosures are retracted and stored, improved rear windows, internal and external overhead lights, speakers, and computerized equipment and a power source for these additions.

The background information discussed below is presented to better illustrate the novelty and usefulness of the present invention. This background information is not admitted prior art.

Originally designed to carry two people and their golf clubs around a golf course, open-air vehicles are now designed to convey from two up to ten people, and occasionally more, and are available in a wide range of styles. The use of open-air carts on golf courses is now nearly ubiquitous. Golf carts provide for golfers, along with all their accessory equipment, to get to the next hole with a minimum of physical exertion. Most carts come with storage space devoted to specific cargo. For example, golf-bag wells are provided in the rear of golf-carts for the golf-bags that are used to hold the golf clubs. Additional accessories for golf-carts presently include additional clubs, tees, golf balls, beverage holders, sand bottles, ball cleaners, cooler trays, upgraded motor or speed controllers, and lift kits.

The use of open-air vehicles, however, is no longer limited to golf course use. The use of open-air vehicles for general, short distance use is growing exponentially. Originally gas-powered, the open-air cars once intended mainly for use on the golf course, are now generally electric powered and mass-produced for use by both golfers and others. Open-air cars are now used in many communities because of their greatly reduced pollution potential, lack of noise, and increased safety for pedestrians and other cars (due to their slower speeds). When built for general transportation the open-air cars are referred to as Neighborhood Electric Vehicles (NEV). Although, these carts are similar to carts made exclusively for use on the golf course, they are now utilized year round. This means they are used in all seasons, including winter.

The demand for NEVs continues to grow for several reasons. For example, citizens of the new style cities that are growing in popularity, such as Peachtree City, Ga., regularly use the carts now only on the golf-course, but also to travel the many miles of cart paths that link the various sections of the city together. The high school population of Peachtree relies so heavily on open-air cart transport the local high school has provided a parking lot dedicated to student carts. Residents rely on NEVs in areas that restrict, or prohibit, the use of fossil-fuel powered motor vehicles. The year-round use of NEVs in retirement communities is steadily becoming the most popular form of transportation.

This rise in popularity of open-air cars, including golf-carts, has led to enhanced design of the cars to suit the needs and wants of their users. Basic design of open-air cars typically includes a roof, often referred to as a "sun-roof", although it is meant to protect the vehicle and its residents from all kinds of weather elements, and a windshield panel of various designs. Side and rear enclosures are also employed to protect the occupants of the car from the elements, including wind, cold, snow, and rain. Additional extra accessories for general purpose open-air carts include: cooler trays, upgraded motor or speed controllers, lift kits, and covers.

When enclosures first were introduced, they were heavy, bulky, and difficult for most to use. These were constructed as "throw-overs", where a single, very large piece of material would be thrown over the entire vehicle to cover the sides as well as the top. A strap sewn onto the inner surface of the cover was used to secure the cover to the car once it was positioned over the roof and hang down the sides. It was soon realized, that as most cars had roofs, the roof covering part of the throw-over was not needed and, thus, added unnecessary bulk, cost, and weight. Currently, enclosures consist generally of panels that hang from various structures attached to a roof. Two-seater open-car enclosures are constructed of three enclosure-panels, one for each side and one for the back, with each panel usually attached to a non-rotatable bar, or elongated-tab, extending along the length of the top edge of the panel. The bar or tab slides into a track that has been mounted to the roof of the cart for that purpose. Screws are often used to affix the track to the roof. When deployed, the cover hangs from the track toward the ground. Toward the lower edge of the cover there may be fasteners to engage with mating fasteners attached to the cart. The top portion of such enclosures is generally made from a transparent material, while the bottom portion is made from a durable opaque material. In this manner, occupants of the car can see out of it when the enclosure is deployed. When the occupants of the car do not want the cover deployed, they may raise the cover toward the roof, and fasten the cover in place using straps, or the like, that may adhere to a valence, or awning, that is attached about the roof for the purpose of providing a support for the un-deployed panel. Each time another seating row is added to a cart, another set of panels is also added. Thus, four-seaters have two panels per side for a total of five panels, not counting the windshield panel. Six seaters require seven panels and so on.

SUMMARY

Now that open-air cars are being used for both golf-related and non-golf-related activities and especially as entire communities are being built around the use of these open-air cars, versus standard vehicles, the present inventor felt that the open-air cars could be made more useful to and valued by their users. The new open-air car population spends a surprising amount of time in their open-air cars. They use them for daily business, such as transport to and from work, shopping, and keeping appointments, as well as for social purposes, in addition to golf. In addition to using their cars during the day, many users often spend an entire evening in them. The new communities designed around cart travel usually have a town square with a bandstand in the center and a large surrounding area both for foot travel and for parking the carts while in the town center. In any one evening, a couple my travel to and park in the town square, enjoy their cocktails, and even eat their dinner—never leaving the car. It is easily understandable that this new generation of open-air cars users will appreciate additional amenities as part of their cart's structure. These people are usually tech-savvy and are accustomed to having communication, educational, and entertainment resources at hand.

Thus, the present invention is directed towards creating an electric cart that is more than just a means of transport. The inventive concepts of the present invention include providing carts with structures that provide amenities that heretofore have only been expected and available from one's home or office. These structures will provide an increase in the user's comfort and safety, as well as provide communication services, entertainment opportunities, value enhancement, and owner prestige. The inventive concept is explained further by the following inventive principles.

To simplify the description of the inventive principles, their use in conjunction with an electric golf-cart will be employed, but it should not be thought that its use is limited to golf-carts. The inventive principles may be used with any open-air vehicle or apparatus that can use a roof structure, and so encompass cars, boats, and carts.

One important inventive principle teaches a multi-component roof or canopy for vehicles that will replace standard roofs. The multi-component roof has several features that are new to the art. For use in the golf-cart industry, the present invention teaches an entire line of multi-component roofs, so that there is a multi-component roof built to the specification of each of the various styles of golf-carts. Each multi-component roof line offers a choice of features.

One feature of the multi-component roof is its set of protective retractable enclosures that include a retractable driver's-side and passengers-side enclosure. The multi-component roof also provides support and storage protective compartments for the support of the retractable driver's-side and passengers-side enclosures and their retracting mechanisms and for storage of the retractable driver's-side and passengers-side enclosures when they are retracted. When in their retracted state, the compartments are designed to protect the enclosures from the damaging rays of the sun and the weather elements. Such protection is important because one of the leading causes of panel deterioration is the damaging rays of the sun, in addition to effects of the elements, such as rain and snow. The support and storage protective compartments are formed as an integral part of the multi-component roof. This can be accomplished in many ways, and all of the ways the support and storage compartments can be formed as an integral part of the multi-component roof are contemplated by the present inventive concept.

In addition to having retractable driver's-side and passengers-side enclosures, the present invention provides an enclosure for the cargo storage space many cart owners now routinely have installed on their carts. The protective enclosure for the cargo storage space is required to accommodate the rear-ward extension of the cargo space and thus, is shaped in the form of an awning, similar to that over baby carriages. When used to protect the cargo storage space that extends from the back-side of an open-air cart, such a rear-side awning may be fitted with transparent panels for visibility. To deploy the windowed awning, it is simply pulled down and unfolded from its storage position. To un-deploy, or retract, the awning structure it is pushed upward to fold it up to its storage position.

The current Inventor realized that repeated folding and unfolding of the awning first leads to the occurrence of fold creases in the window panel and then, ultimately to the formation of cracks and splits, ruining both the visibility and protection features of the window. Accordingly, the Inventor conceived the inventive concept of designing the windows of a windowed awning so that their fold area does not include the more rigid material of the window, but instead is provided with a material that is impervious to the effects of repeated folding and unfolding while maintaining the visibility required for safety reasons. This repeatedly foldable rear-side enclosure is part of the present multi-component roof inventive concept. The new enclosure is provided with a flexible, foldable material insert between top and bottom transparent plastic panels that make up the rear window. The cloth insert, that may or may not be transparent, has the degree of flexibility required to sustain repetitive folding without being damaged or even marred. This saves the rear enclosure from the damage that presently occurs when repetitively folded, especially when folded in cold weather. Also available for enclosures for rear storage compartments not of the retractable style, is a set of support arms designed to have a front forward hinge design. This design provides extra stability for enclosures in closed position, as the forward centering of the hinge keeps the enclosure's weight directed toward the rear of the cart allowing the force of gravity to assist in maintaining the enclosure in its closed position.

The retractable driver's-side and passengers-side panel enclosures of the present invention can be easily and rapidly deployed, that is opened fully to provide complete protection from the elements and un-deployed when not required. The retractable driver's-side and passengers-side panels made for the sides of an open-air cart are usually opened by rolling them up, either mechanically or by motor action, and when enclosure is desired, they are rolled-down. To ease the opening and closing of the retractable driver's-side and passengers-side enclosures, also referred to as panels, the panels are attached to rotatable supports and the multi-component, multi-sectioned roof is provided with either a mechanical or powered control mechanism, assuring that the retraction and extension of the panels is easily doable for anyone, including those whose strength may be compromised or are of short stature. The storage compartments are located on both the driver's and passenger's side of the cart's roof and if desired there is also a storage compartment over the rear storage area of the cart. Alternatively, the rear enclosure may be retracted into either a combination of the roof and the roof supports or just into storage compartments constructed as part of the roof.

Whether street legal or limited to village travel, open-air carts need to be visible to other drivers, especially at dusk or while engaged in night driving. Providing Illumination on the outside of the cart allows the driver and passenger to see the area about the outside of the cart and for others to know the presence of the cart, even if only one side of the cart is visible. Illuminating the inside of the cart allows users to see the controls, a map, or even to read a newspaper while having evening cocktails. For example, using LED DC (Light-emitting diode, direct current) rope lighting, the present invention provides for indirect, soft lighting for a cart. In one instance, LED lights are attached to the valance between the main flap of the valance and its decorative ruffle trim. This allows for the lighting to be present on every side of the cart and is especially attractive if the lighting is softened by being positioned under a ruffled valance. Having the lightening positioned between the valance and its ruffle softens the light so that, while the cart is fully illuminated when viewed by others, the lighting does not provide a distraction to the driver. A LED DC rope does not require much power and, thus, will not pose a threat to the long life of the battery. The LED ropes are available to be run on 12, 24, 36, and 48 volt batteries. The lights are available in many colors and can be coordinated to the colors of the cart. If the lights are solar powered LED rope lights, they do not depend at all on battery power. For carts that do not have a ruffled valance about the entire cart, the inventive principles provide for the LED lights to be attached to rigid light mount that is attachable to the roof, the roof supports, or the sides and rear of the cart. The LED lights are also available in custom-designed patterns that are sewn onto or into the protective side and rear panels of the cart. For example, the cart's protective panels may be lighted by initials of the driver on the driver's side and the initials of the passenger on the passenger's side. The name of the cart may be part of the back-panel of the cart. In each of these instances, light is provided for others to easily see the cart even in the dark, but will not cause a glare to distract the driver. Accordingly, the multi-component roofs, as taught herein, are each supplied with a power source to power a lighting system to illuminate both the outside and the inside of the cart, providing for safety, comfort, and convenience. For instance, the lighting system taught in the present invention could be powered by the battery, whereas the opening and closing of the retractable enclosures could be powered by a wire harness or by a tubular motor. There are many different systems of lighting, LED are only one. All systems of lighting that can fulfill the requirements of the concepts of this invention are contemplated for use with this invention.

There are many ways of powering accessories and it should be understood that any powering system, motor, or device that will provide the power required is contemplated by the present invention. The power system of the present invention is available with either battery or solar charging systems and will also be used to power and charge additional accessories, such as a GPS (global positioning station), stereo speakers, computerized note-books and smart phones. To increase comfort while the cart is in use, the roof also houses a rotatable fan for use in warm weather and a heater for use in cold weather.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

THE REFERENCE NUMBERS AND PARTS TO WHICH THEY REFER

1 Side enclosures.
4 Valence.
6 valance ruffle.
8 LED rope lighting
12 LED rope lighting attachment loops.
14 Rolled-up enclosure panels.
20 Rear side foldable retractable enclosure.
22 Roof support for Multi-component roof 40.
24 Rear-side retractable enclosure.
26 Key control unit.
30 Storage sections for retractable side enclosures of multi-component roof 40.
32 Golf club storage area.
40 Multi-component roof.
42 Multi-component roof topside.
44 Underside of multi-component roof.
46 Multi-component strengthening roof ribs.
48 Multi-component roof wing valence supports.
50 Support and protective brackets.
50a Horizontal leg of support and protective brackets.
50b Vertical leg of support and protective brackets.
52 Support aperture.
62 Side panel of rear retractable enclosure 24.
64 Middle panel of rear retractable enclosure 24.
66 Frame support of rear retractable enclosure 24.
68 Enclosure tab of rear retractable enclosure 24.
70 Window of rear retractable enclosure 24.
72 Flexible, repeated foldable strip between windows 70.
80 Speakers.
82 Heater
84 Air-conditioner.
86 Stereo.
88 Reading lights.
90 GPS.
92 Key motor control.

100 Cart with multi-component roof 40.
110 Cutout space.
112 Space within roof support for storing rear-side enclosure.

DEFINITIONS

Boss, as used herein, refers to a projection or an enlarged section of a casting through which an aperture or other structural component may be machined.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

Figure 1:
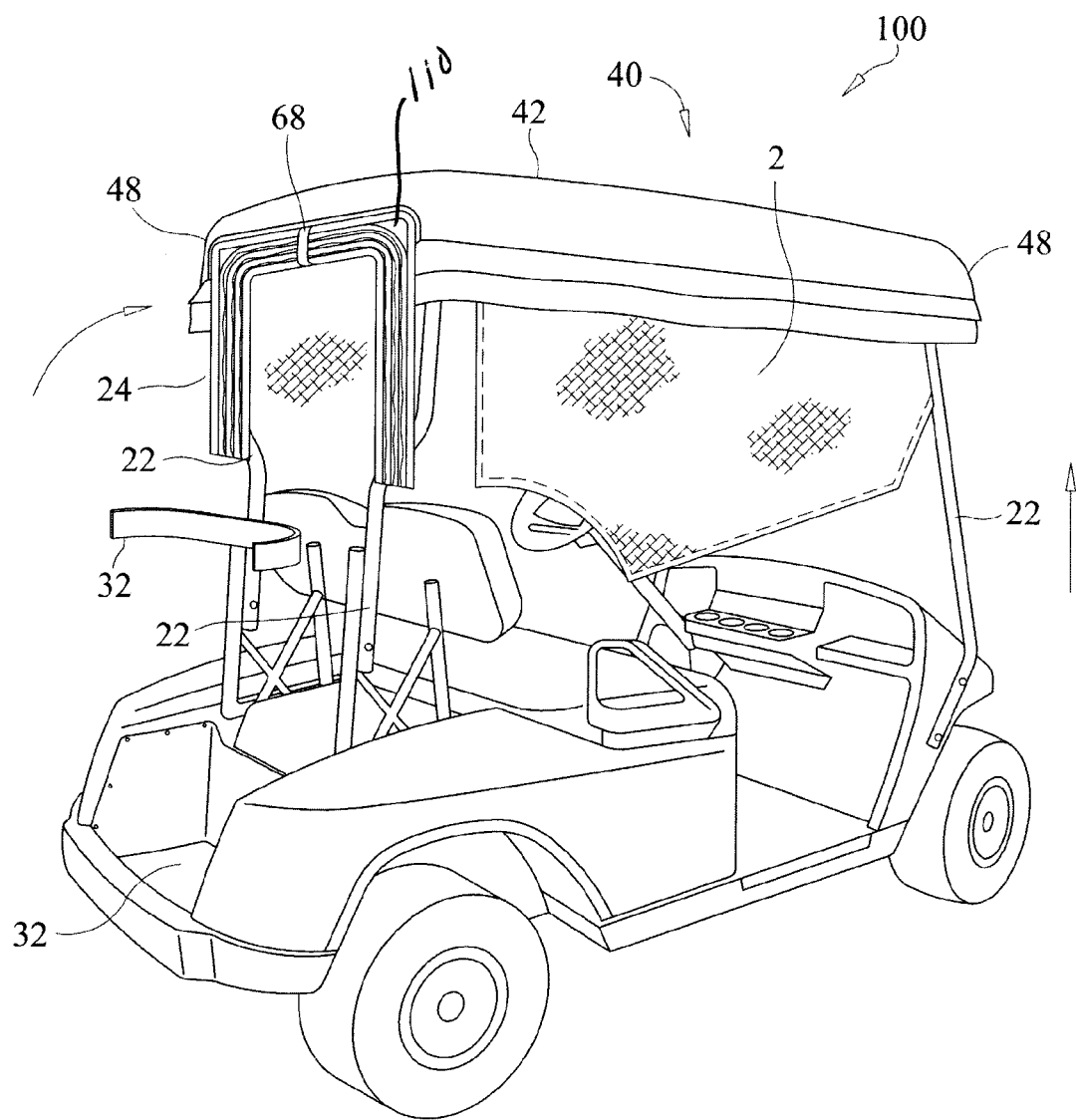
FIG. 1 is a perspective view of a passenger's side and rear side of a golf-cart illustrating the cart's multi-component roof, partially open side enclosure 2, and folded-close rear-side awning-type enclosure 24.
Figure 1A:
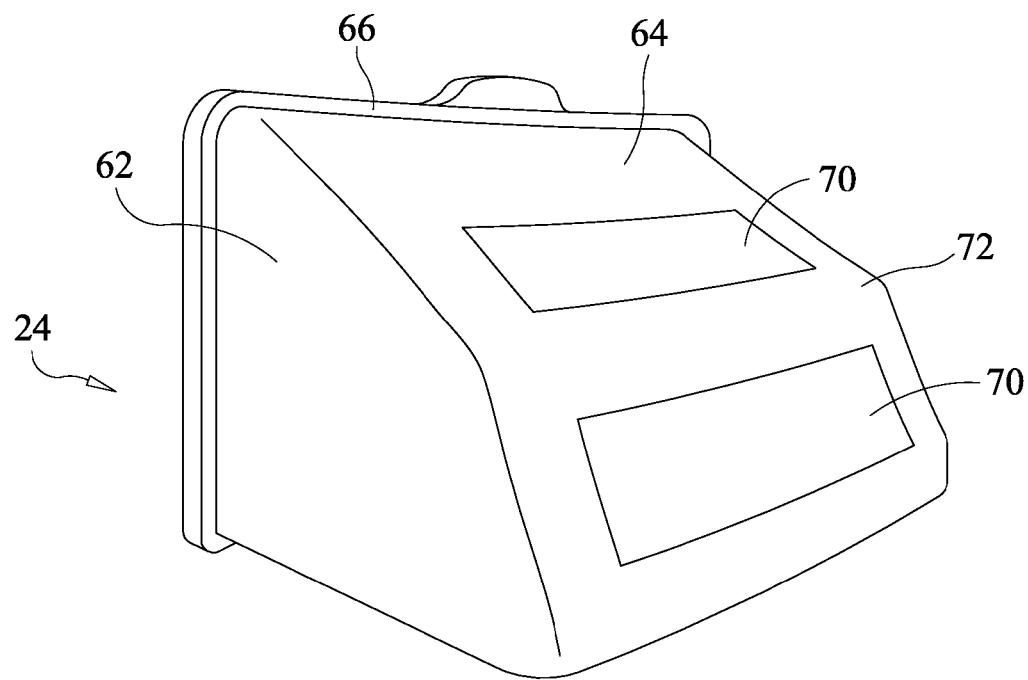
FIG. 1A is a perspective view of an open rear-side awning-type enclosure.
Figure 1B:
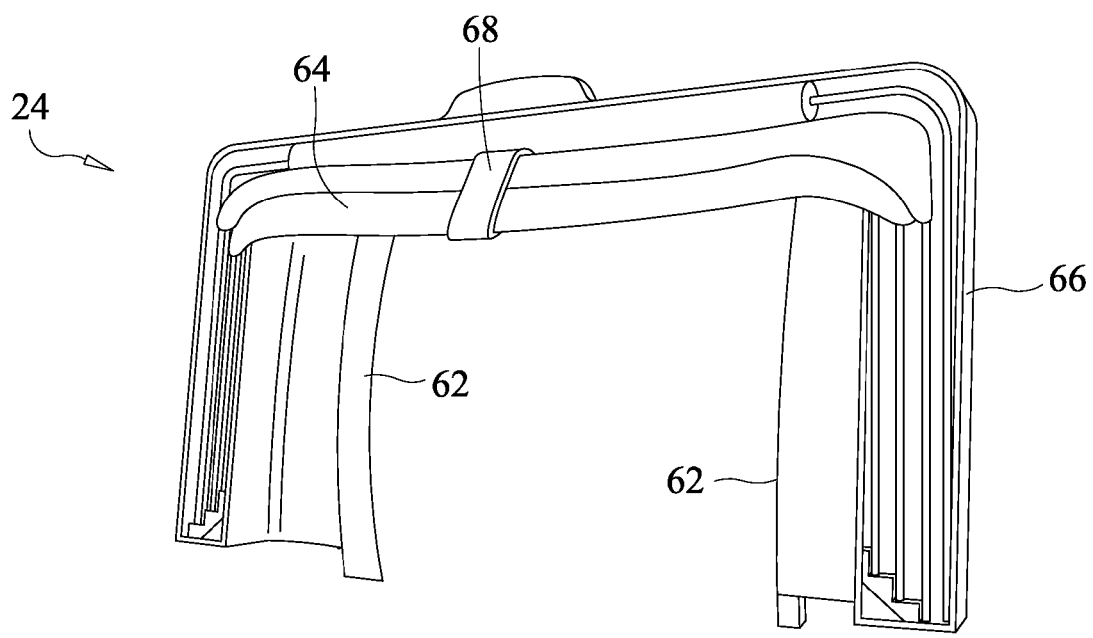
FIG. 1B is a perspective view of a folded-closed rear-side awning-type enclosure.
Figure 2:
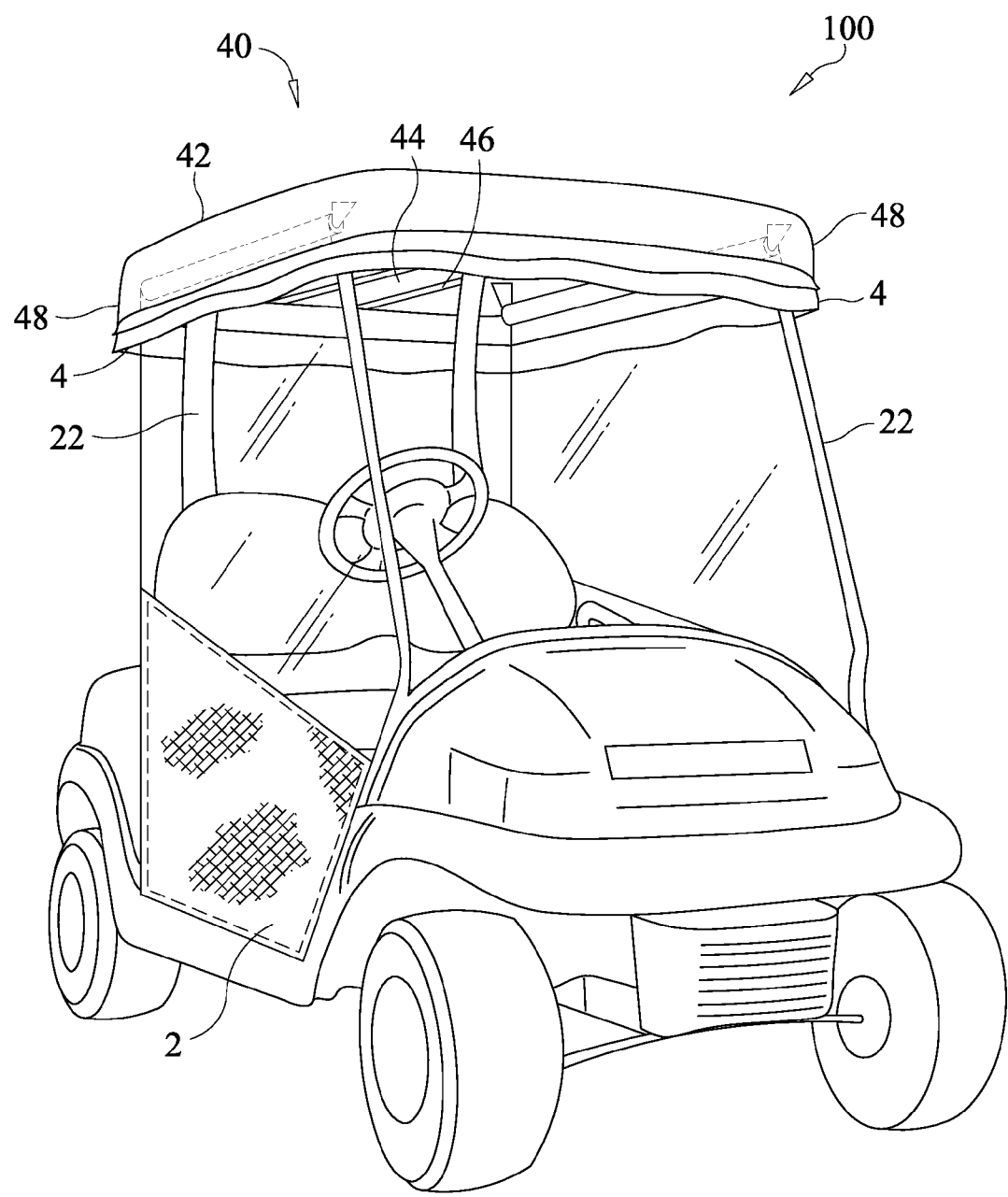
FIG. 2 is a perspective view of the front and passenger's side of a cart illustrating multi-component roof 40 and fully-deployed passenger's side enclosure 2, as shown in FIG. 1.
Figure 2A:
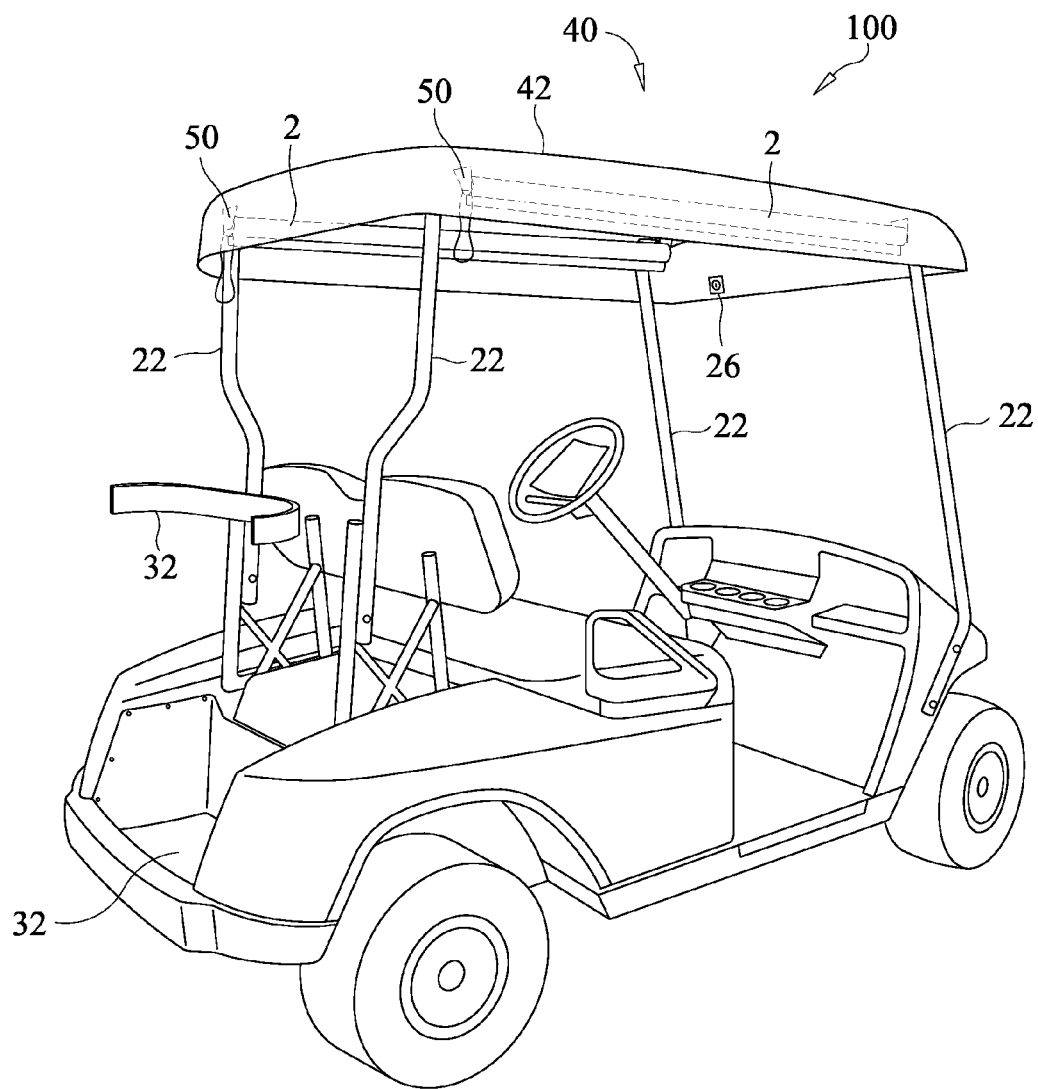
FIG. 2A is a perspective view of the rear and passenger's side of a cart illustrating multi-component roof 40 and fully-un-deployed (rolled-up) passenger's side enclosure 2, as shown in FIG. 1.
Figure 2B:
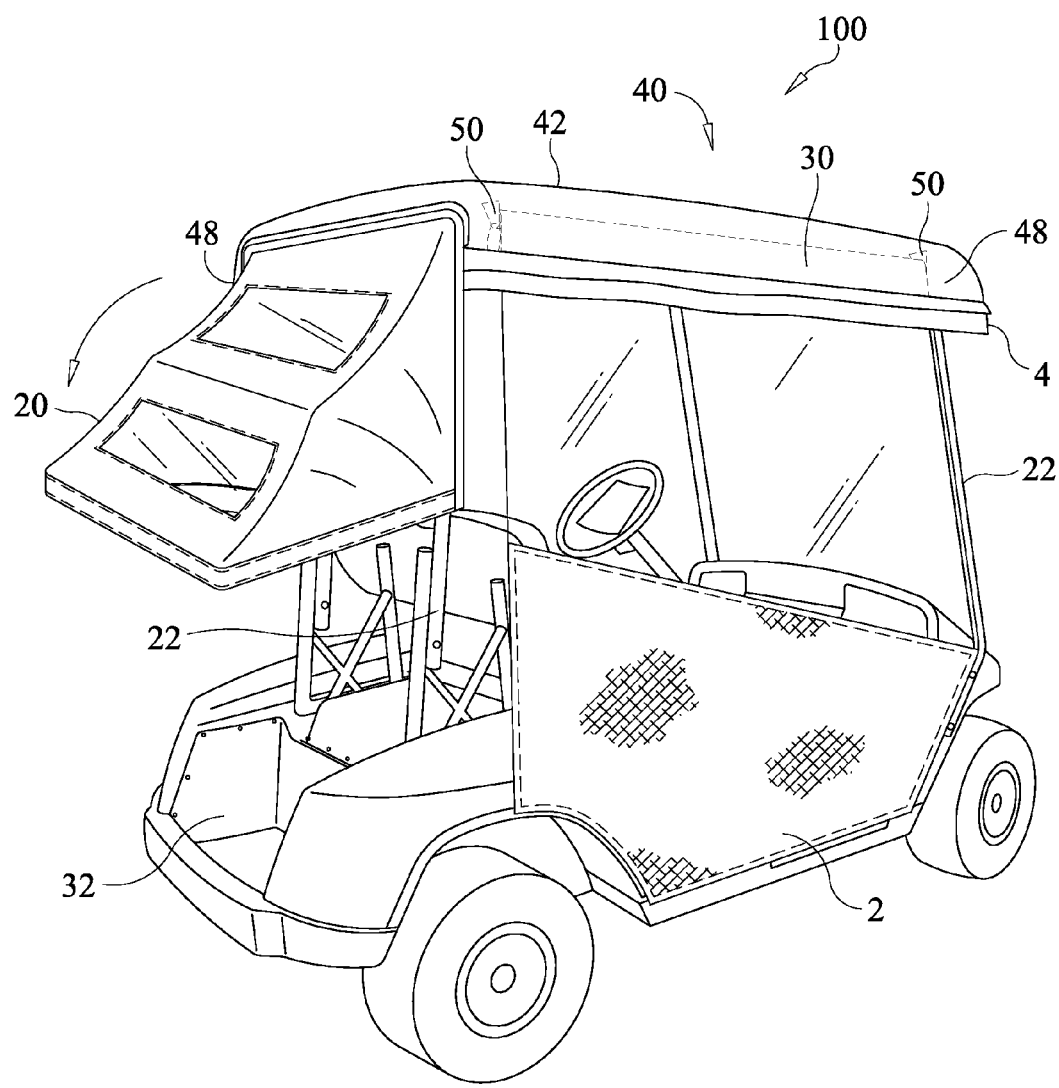
FIG. 2B is a perspective view of the rear and passenger's side of a cart illustrating multi-component roof 40 and fully-deployed (rolled open) passenger's side enclosure 2 and open rear-side awning-type enclosure, as shown in FIG. 1.
Figure 2C:
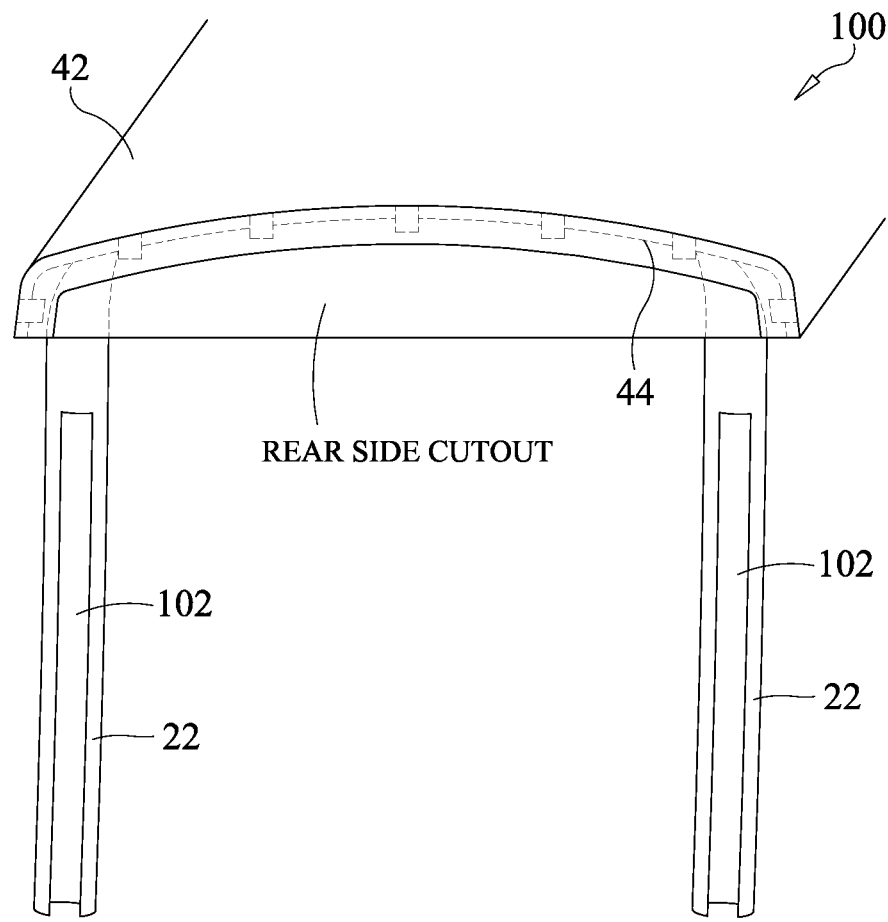
FIG. 2C is a perspective view of the rear-side roof supports with their structure designed to provides storage space for folded closed rear-side awning-type enclosure.
Figure 4:
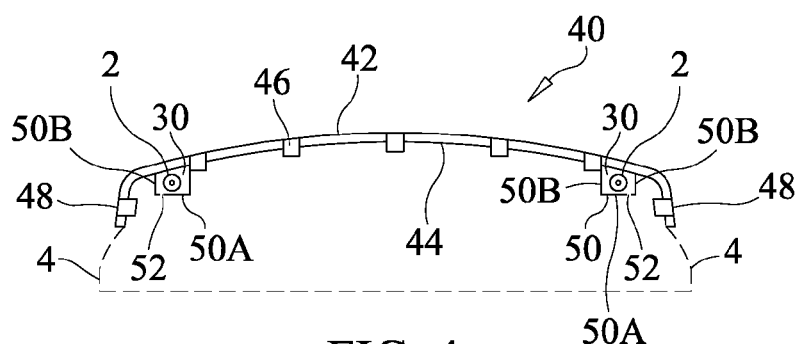
FIG. 4 is a cross-sectional view of multi-component cart roof as shown in FIG. 3.

Turning now to the drawings, FIG. 1, a view of the passenger's side and the rear side of golf-cart 100, illustrates one example of multi-component roof 40 with rear-side retractable awning-like enclosure 24 folded and inserted into its storage space. It should be understood that the awning-like structure of the rear-side enclosure is not amenable to being simply rolled-up into a storage container as are the passenger and drivers side enclosures. Storing this enclosure is more complicated than storing the passenger's side and driver's side retractable enclosures, because, unlike the passenger's side and driver's side enclosures which are flat, such as a simple roll-able window shade, and can be easily rolled up and down about a roller mechanism, the rear-side enclosure has a three-dimensional shape comparable to that of a window awning with side panels. Rear-side enclosure has middle panel section 64 and two side panels sections 62 that must be folded-closed before the enclosure can be stored, as illustrated in FIG. 1A. FIG. 1B illustrates rear-side retractable enclosure 24 folded closed ready to be tucked into its storage spaces. As illustrated by FIG. 1 and FIG. 1B, once rear-side retractable enclosure 24 is folded, middle panel 64 of rear retractable enclosure 24 is horizontal relative to the ground and can be tucked into its horizontally positioned storage space 110 as illustrated in FIG. 1. This storage space is a space carved out of roof 40, as illustrated. Folded close middle panel 64 of enclosure 24 may alternatively be stored in a structure 50 that is part of the roof structure, as is illustrated in FIG. 4 for storage and support of the driver and passenger side enclosures. Another alternative storage mechanism is to have folded close middle panel 64 of enclosure 24 stored within specially designed rear roof supports 22. These supports are similar in shape and function to the original roof supports 22, but are constructed to have a semi-circular cross-section and to be of the width required to accept both middle panel 64 and side panels 62 for storage. FIG. 2C is a perspective view of the rear-side roof supports 22 with their structure designed to provides storage space 102 for folded closed rear-side awning-type enclosure. Note that both middle panel 64 and side panels 62 are attached to and supported by frame support 66. Once rear retractable enclosure 24 is folded close and inserted into its storage space, enclosure tab 68 is used to secure folded closed rear retractable enclosure 24 in its folded closed position. In this example enclosure tab 68 is provided with a hook and loop closure tab that interacts with its mating tab on frame 66. Windows 70 of the windowed awning-type enclosure 24, as illustrated in FIG. 1A, are positioned within middle panel 64 so that there is a flexible, foldable material insert 72 between top and bottom transparent plastic panels 70 that make up the rear window ensuring that the fold area 72 does not include the more rigid material of the window. The flexible, foldable material insert 72 between top and bottom transparent plastic panels 70 is of a material that is impervious to the effects of repeated folding and unfolding while maintaining the visibility required for safety reasons. This repeatedly foldable rear-side enclosure is part of the present multi-component roof inventive concept. The cloth insert, that may or may not be transparent, has the degree of flexibility required to sustain repetitive folding without being damaged or even marred. This saves the rear enclosure from the damage that presently occurs when repetitively folded, especially when folded in cold weather. Folding and opening the rear-side enclosure is easy and rapid using a set of support arms designed to have a front forward hinge design. This design provides extra stability for enclosures in closed position, as the forward centering of the hinge keeps the enclosure's weight directed toward the rear of the cart allowing the force of gravity to assist in maintaining the enclosure in its closed position. It should be understood that the retract-ability of enclosures, according to the teachings of the present invention, is not limited to any single design or manufacturer.

Storage spaces 30 (see FIG. 4) for the storage of retractable side enclosures 2 are a part of the structure of roof 40 and are situated along the length of both the driver's side and the passenger's sides of roof 40. FIG. 2 illustrates the retractable passenger side enclosure fully extended, open for use. FIG. 2A, illustrates the retractable passenger side enclosure 2 fully retracted into space 30, delimited by storage and support structure 50, for storage. Note that rear-side awning-type enclosure 24 is not illustrated on this drawing for clarity. FIG. 2B illustrates multi-component roof 40 and fully-deployed (rolled open) passenger's side enclosure 2 and open rear-side awning-type enclosure 20. Both of the side enclosures, as illustrated herein, are constructed from a transparent material on the top part of the enclosure while the lower half is constructed from a non-transparent material. This provides for both ease of visibility and some privacy. It should be understood, however that the choice of material used for the construction of the enclosure panels is within the scope of the present inventive principles.

In the example provided herein, the rolling open and closed of enclosures 2 are electrically powered, so that a simple working of a control will either retract an enclosure for storage or release one for use. The control 26 illustrated in FIG. 2A is a key control so that once the key is removed the power is not available. Removing the key guards against misuse, accidental or deliberate, of the devices, for example, as the cart is being parked or maintained. The enclosures are also available in non-powered designs. A pull chain, cord or lever will mechanically accomplish the opening and closing of the side enclosures just as typical designs of window shades control the opening and closing of the shade.

Figure 3:
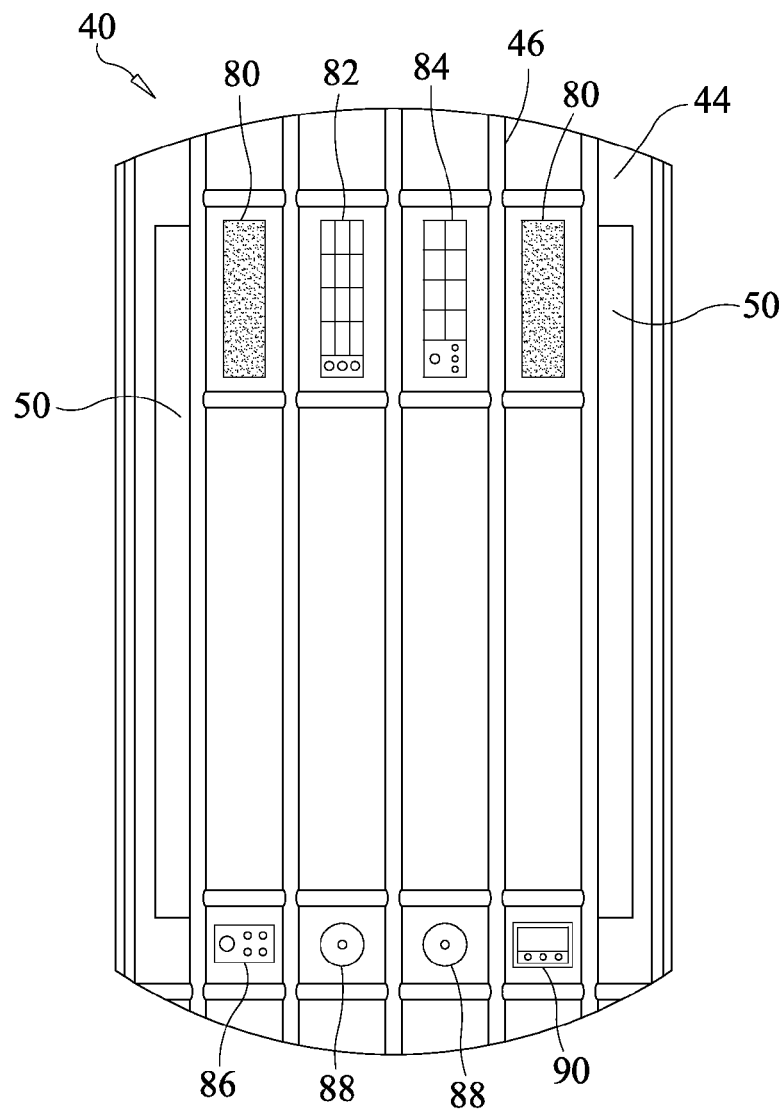
FIG. 3 is a view of the underside of a multi-component cart roof having a retractable enclosure storage compartments and accessories.

FIG. 3, a view of an underside of roof 40, and FIG. 4, a cross-section of roof 40, illustrate an example of roof 40 constructed as a ribbed single-ply roof having exterior surface 42 and interior surface 44 with thick ribs 46 extending downwardly into the interior space between exterior surface 42 and interior surface 44 and, if desired, may protrude out from interior surface 44 as shown. Ribs 46, in this example, are formed as roof 40 is being formed, such as during a molding process. In addition to the additional strength ribs 46 provide to roof 40, they are structured to support and contain various accessories, such as bosses are known to do. Interior surface 44 is constructed with open receiving spaces that are specified to accept various accessories, such speakers 80, heater 82, air-conditioner 84, stereo 86, reading lights 88, and a GPS 90 in addition to one or more motors that may be required to power any of the accessories. The accessories may be controlled by a panel that is positioned near to the drivers or by controls on each of the accessories or by both. Such controls that are known are not discussed further herein. It is to be understood that any type of control that will achieve the desired control of a desired accessory, known or yet to be known are contemplated to be within the scope of the present invention. Thick ribs 46 are used to secure the accessory components to roof 40. Thick ribs 46 also support the power instrumentality that, among other uses, provides the power for opening and closing the retractable enclosures. It should be understood that although the present example discusses powered retract-ability, the system is also available with non-powered mechanical controls, if desired. Roof 40 also has the two retractable enclosure storage compartments 50, as discussed above, one for supporting and storing the driver's side retractable enclosure and another for supporting and storing the passenger's side retractable enclosure, which are better understood by viewing FIG. 4 along with FIG. 3. Supports 50 extend along the length of the driver's side and the passenger's side of the cart to the extent that is required to support, store, protect, and control the use of the enclosures.

FIG. 4, a cross-sectional view of a multi-component open-air car roof, illustrates in this example, how storage compartments 50 both support and protect retractable enclosures 2. Retractable enclosures 2 are stored in space 30 that is defined by horizontal legs 50a and vertical legs 50b of storage compartments 50. The horizontal legs of storage compartments 50 are means of support for retractable enclosures 2 along with the support provided by the rotatable support spindle about which each enclosure is positioned and attached. To ease the opening and closing of the retractable driver's-side and passengers-side enclosures, also referred to as panels, the panels are attached to rotatable support spindles (not shown). The multi-component, multi-sectioned roof is provided with either a mechanical or powered control mechanism for powering the closing and opening of the enclosures, assuring that the retraction and extension of the panels is easily doable for anyone, including those whose strength may be compromised or are of short stature. Any such attachment, known or yet to be known, that will provide the support and rotatability required by the present inventive concept is contemplated as part of the invention. In this example, when fully retracted, enclosures 2 are completely out of sight and protected from the elements within storage space 30. When deployed for use, enclosures 2 extend down through support apertures 52. Also illustrated in FIG. 4 are roof "wing" valence supports 48 that are, in this example, used to support a valence on each side of the cart. Roof "wing" valence supports 48 also provide support for the cart's lights, which is this example are LED (light emitting diodes). The power source for the lights and for the motor that runs the powered enclosure retraction device is, in this example, a wiring harness that is stored within the confines of roof 40. The power sources available vary from batteries to solar. The power supply also provides power for computerized note-books having GPS and smart phones. The roof also houses a rotatable fan for use in warm weather and a heater, for use in cold weather, both powered by either a motor or a wiring harness, or both.

Figure 5:
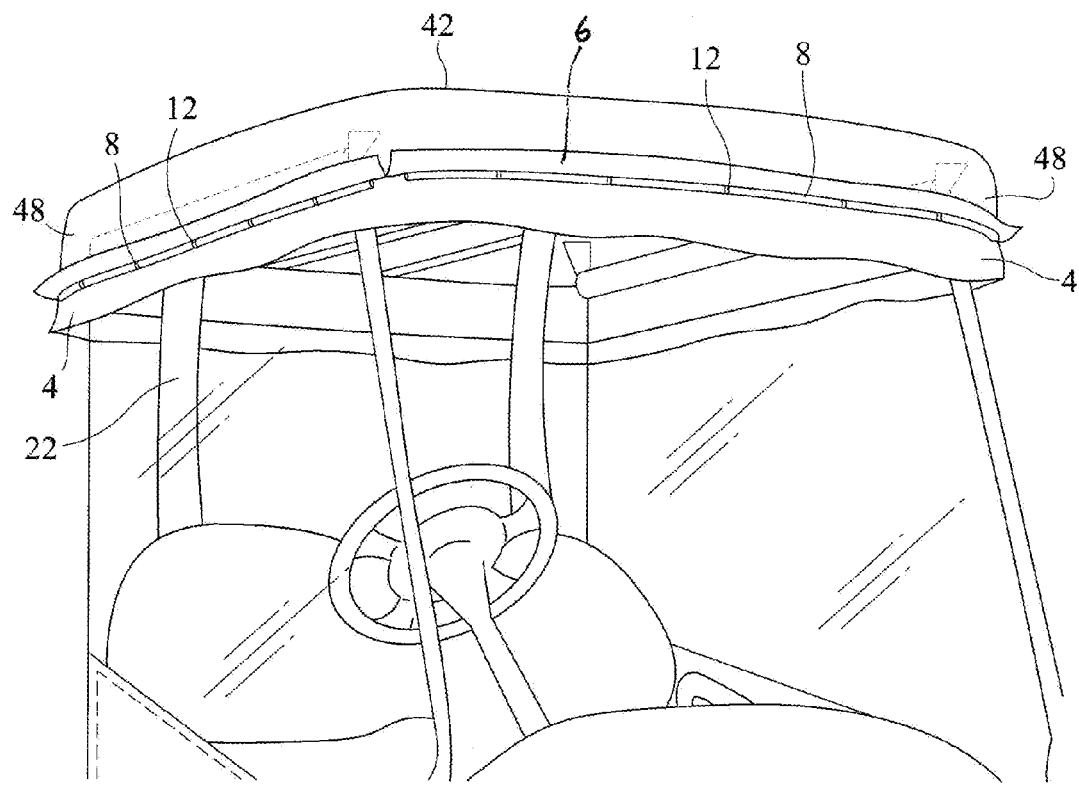
FIG. 5 is a perspective view of LED rope lights between valence and valence ruffle.

FIG. 5, a perspective view, illustrates cart roof 40 having LED rope lighting 8 installed between valance 4 and valance ruffle 6. In this example, valance 4 and valance ruffle 6 are formed from a continuous piece of fabric, with the fold between the valance and ruffle having LED rope lighting attachment loops 12 providing for rope lighting 8 to be attached to the underside of the valance/ruffle. This keeps the lighting fixture out of site while providing for indirect but effective lighting to radiate through the valance. Supplying the lighting preinstalled with the cart's valance saves each cart owner from having to purchase and install a lightening fixture of exact length required, rope lighting attachments, and the electrical connections to connect the rope lighting to a battery that is part of the cart's structure. The LED lights shown are 12 volt DC powered as all carts have at least a 12 volt battery. The lights, however, are available in 24, 36, and 48 volts. The lights are also available in a large range of colors and sizes providing each cart owner to coordinate the color of the lights with the colors of the cart and to have lights that meet the owners need for a desired light intensity. Although the lights may be more or less intense, they are always indirect and never provide any glare to hinder the driver's vision. In addition to battery supplied powered, the rope lights are also available as solar powered. FIG. 5 illustrates the rope lighting pre-installed between valance 4 and valance ruffle 6. Not shown is the lighting extending around the entire cart from the passenger's side to the rear side and then to the driver's side. The cart owner may choose the extent of the lighting. If desired only one or several sides of the cart may be illuminated. Additionally, lighting is also available within protective enclosures 2. Lighting within the panels is available in any desired pattern, including words and monograms. The lighting fixture, that is the LED rope lights, is also hidden from direct view keeping the lighting subdued and discreet. The rope lights are flexible and do not hinder the ability of the protective panels to be rolled up or down. It is clear that the lights that are installed between the front window panel's valance and ruffle are completely out of direct sight. If desired, however, a string of lights within, or without, a band of material may also be positioned about the window panel or anywhere else on the vehicle, including about the roof, roof supports, storage compartment, or body of the vehicle. The cart may be fitted with as much or as little light as desired by the vehicle's owner. The lights are controlled by either the key control as discussed above or by a control on the control panel near the driver, as discussed above.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A multi-component roof for a golf-cart, comprising:
a roof having as part of it structure:
- an interior surface
- a driver's side retractable enclosure panel housed in
  - a driver's side storage compartment along a length of a driver's side of said interior surface of said roof, said driver's side storage compartment structured to support, store, and protect said driver's side retractable enclosure and
- a passenger's side retractable enclosure panel housed in
  - a passenger's side storage compartment along a length of a passenger's side of said interior surface of said roof, said passenger's side storage compartment structured to support, store, and protect said passenger's side retractable enclosure, or
- a rear side awning-like retractable enclosure housed in
  - a rear side storage compartment structured to support, store, and protect said rear side foldably-retractable awning-like enclosure, or both.

2. The multi-component roof, as recited in claim 1, wherein said awning-type rear-side enclosure has at least two window panes.

3. The multi-component roof, as recited in claim 2, wherein said awning-type rear-side enclosure has a strip of material impervious to repeated bending and folding between said window panes.

4. The multi-component roof, as recited in claim 1, further having rear-side roof supports, said rear-side roof supports shaped as a roof support storage compartment, said roof support storage compartment storing said rear-side awning-like retractable enclosure when it is retracted.

5. A multi-component roof for a golf-cart, comprising:

a golf-cart roof having as part of its structure an interior surface and a retractable enclosure storage compartment along a length of a driver's side of said interior surface of said roof and a retractable enclosure storage compartment along a length of a passenger's side of said interior surface of said roof, a driver's side retractable enclosure panel to be supported and protected by said driver's side retractable enclosure storage compartment and a passenger's side retractable enclosure panel to be supported and protected by said passenger's side retractable enclosure storage compartment, a rear-side retractable enclosure, and a rear-side storage compartment along a length of a rear-side of said roof structured to support and protect said retractable rear-side enclosure.

* * * * *